United States Patent [19]

Morishita et al.

[11] Patent Number: 4,617,626
[45] Date of Patent: Oct. 14, 1986

[54] CHARGE CONTROL MICROCOMPUTER DEVICE FOR VEHICLES

[75] Inventors: Mitsuharu Morishita; Shinichi Kouge, both of Hyogo, Japan

[73] Assignee: Mitsubishi Denki Kabushiki Kaisha, Tokyo, Japan

[21] Appl. No.: 496,034

[22] Filed: May 19, 1983

[30] Foreign Application Priority Data

May 19, 1982 [JP] Japan .................................. 57-86061

[51] Int. Cl.$^4$ ..................... H02J 7/14; G06F 15/56
[52] U.S. Cl. .................................... 364/424; 364/483; 320/61; 320/62; 322/22; 322/23; 324/433
[58] Field of Search ........... 364/481, 483, 424, 431.04, 364/431.03; 320/32-34, 36-43, 48, 49, 61, 64, 62, 72; 324/433

[56] References Cited

U.S. PATENT DOCUMENTS

| | | | |
|---|---|---|---|
| 3,477,013 | 11/1969 | Smith | 322/32 |
| 3,991,357 | 11/1976 | Kaminski | 320/22 |
| 4,153,867 | 5/1979 | Jungfer | 320/43 |
| 4,290,109 | 9/1981 | Taniguchi et al. | 320/32 |
| 4,305,254 | 1/1981 | Kawakatsu et al. | 60/716 |
| 4,308,492 | 12/1981 | Mori et al. | 320/43 |
| 4,418,310 | 11/1983 | Bollinger | 320/39 |
| 4,423,378 | 12/1983 | Morino et al. | 320/48 |

FOREIGN PATENT DOCUMENTS

| | | |
|---|---|---|
| 0010449 | 4/1980 | European Pat. Off. . |
| 7816679 | 5/1978 | France . |
| 8013645 | 6/1980 | France . |
| 2052121 | 1/1981 | United Kingdom . |

OTHER PUBLICATIONS

Hood, "Electronic Penetration in Autos-Systems on Wheels," 1974 IEEE *Intercon Technical Papers*, Mar. 26-29, 1974, Session 36, paper 36/1, pp. 1-6.
Groves "Controllers Come of Age," *Computer Design*, vol. 19, No. 5, May 1980.

*Primary Examiner*—Felix D. Gruber
*Assistant Examiner*—Thomas G. Black
*Attorney, Agent, or Firm*—Sughrue, Mion, Zinn, Macpeak, and Seas

[57] ABSTRACT

A charging system control system includes a microcomputer for determining the most proper voltage regulator reference value setting according to input data received thereby, and controls a clutch and a speed change gear disposed between the engine and the charging generator so as to operate the generator within an optimum r.p.m. range. The microcomputer further performs fault detection on the basis of charging system data input thereto and effects display of the detection results by means of a display unit.

4 Claims, 1 Drawing Figure

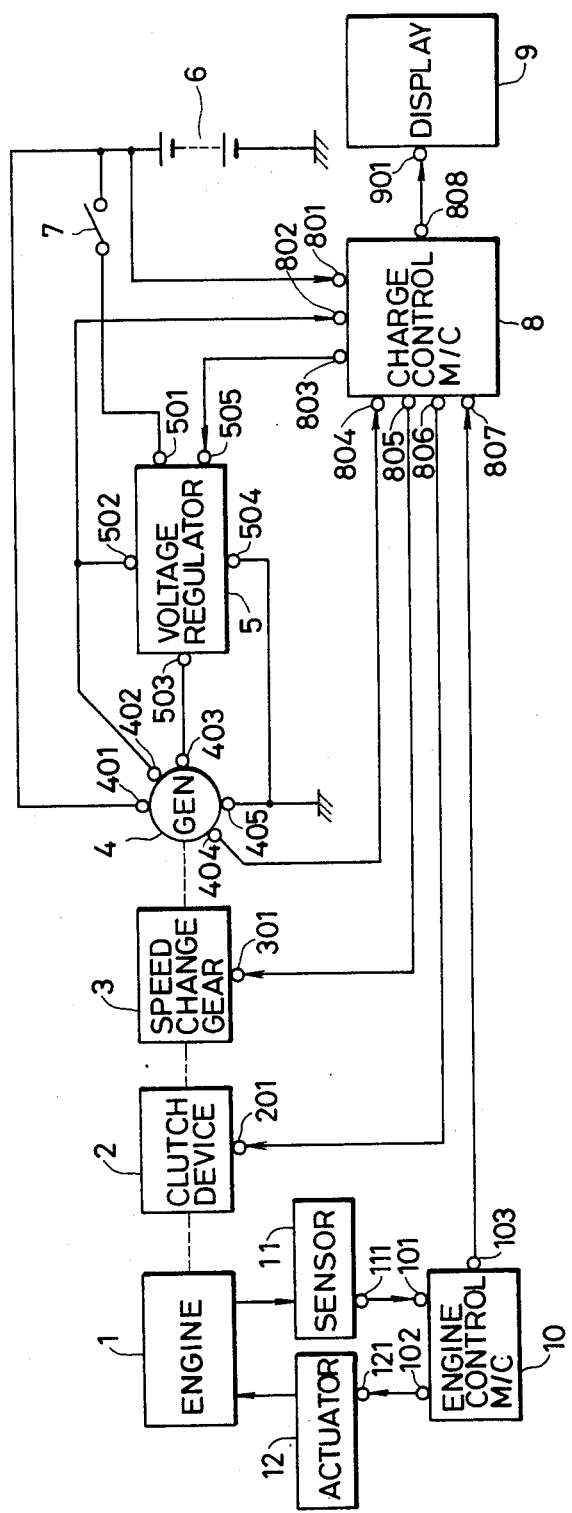

CHARGE CONTROL MICROCOMPUTER DEVICE FOR VEHICLES

BACKGROUND OF THE INVENTION

This invention relates to a charge control microcomputer device for a vehicle, in which, in order to drive the charging generator on the vehicle or the like within an optimum, predetermined r.p.m. range, a clutch device and a speed change device are arranged between the charging generator and the engine driving the generator. A predetermined (reference) value of the voltage regulator for controlling the output voltage of the generator is externally set, and failures are detected according to data received from various points in the charge system, and the results of this detection are displayed.

In general, in a conventional device of this type, the output of a charging generator driven by an internal combustion engine of a vehicle or the like is controlled to a predetermined value, so as to charge the battery of the vehicle. However, the conventional device suffers from a drawback in that, where the predetermined value is controlled during acceleration or deceleration of the engine to thereby control the output of the generator, which is the mechanical load of the engine, it is difficult to externally control the output, and in that the occurrence of problems in the charging system, for instance, when the charging generator generates no power, or is not controlled at all, and the first rectifier output terminal is disconnected, cannot be detected.

A conventional charging generator generally employs a drive system wherein the generator is driven, with a certain speed change ratio, through a belt or the like by the internal combustion engine. However, this system is disadvantageous in that the output current and efficiency of the charging generator vary with the speed of the engine; the output current is insufficient at the low speed operation of the engine, and is saturated at high speeds, thus increasing the loss of power.

SUMMARY OF THE INVENTION

Accordingly, an object of this invention is to provide a charge control microcomputer device for a vehicle, in which the above-described difficulties have been eliminated.

BRIEF DESCRIPTION OF THE DRAWING

The single FIGURE in the accompanying drawing is a block diagram showing one embodiment of this invention.

DETAILED DESCRIPTION OF THE PREFERRED EMBODIMENT

One embodiment of the invention will now be described with reference to the accompanying drawing. In the single FIGURE in the accompanying drawing, reference numeral 1 designates an internal combustion engine installed in a vehicle or the like; 2, a clutch device for transmitting the output torque of the engine 1; 201, an input terminal for receiving an operating instruction (as to engagement, disengagement or slip) from a charge control microcomputer 8 (described later); 3, a speed change gear for changing the speed of the engine transmitted through the clutch device 2 and transmitting the speed thus changed; 301, an input terminal for receiving a transmission ratio instruction from the charge control microcomputer 8; 4, a charging generator driven by the speed change gear 3; 401, a first rectifier output terminal; 402, a second rectifier output terminal; 403, a field coil output terminal; 404, a neutral point voltage output terminal through which generated voltage data is obtained from the neutral point of star-connected armature coils (not shown); 405, a ground terminal; 5, a voltage regulator for controlling the output voltage of the generator 4 to a predetermined value; the regulator 5 having an initial excitation terminal 501, a voltage detection terminal 502, a field coil input terminal 503, a ground terminal 504 and an external control input terminal 505.

Further in the FIGURE, reference numeral 6 designates a battery which provides battery terminal voltage data; 7, a key switch; 8, the aforementioned charge control microcomputer; 801, a battery terminal voltage input terminal; 802, a second rectifier output terminal voltage input terminal; 803, a reference signal output terminal through which an external control reference signal is applied to the external control input terminal 505 of the voltage regulator 5; 804, a neutral point voltage input terminal; 805, a transmission ratio instruction output terminal through which a transmission ratio instruction is applied to the speed change gear 3; 806, an output terminal for applying an operating instruction to the clutch device 2; and 807, an input terminal for receiving data from an engine controlling microcomputer 10.

Further in the FIGURE, reference numeral 10 designates the aforementioned engine controlling microcomputer for receiving engine data, for example, the intake air temperature, r.p.m., crank angle, exhaust gas temperature, air fuel mixing ratio, etc., from the engine 1, to control the engine 1; 101, an input terminal for receiving a signal from a sensor 11 (described later); 102, an engine control signal output terminal; 103, an output terminal for applying data to the microcomputer 8; 11, the aforementioned sensor for detecting the engine state and applying the detection signal to the engine controlling microcomputer 10; 12, an actuator for receiving a control signal from the microcomputer 10, to machanically drive a part of the engine 1; and 121, a control signal input terminal.

The operation of the device thus arranged will now be described.

When the key switch 7 is closed to start the engine 1, a loop circuit made up of the battery 6, the key switch 7, the initial excitation terminal 501 and the voltage detection terminal 502 of the voltage regulator 5, the second rectifier output terminal 402 of the charging generator 4, the field coil of the generator 4 connected to the field coil output terminal 403, and the field coil input terminal and the ground terminal 504 of the voltage regulator 5 is completed. As a result, an initial exciting current flows in the field coil and a field magnetomotive force is induced. In this operation, the terminal voltage of the battery 6 is applied through the key switch 7 to the microcomputers 8 and 10, and, when necessary, to the clutch device 2, the speed change gear 3, the sensor 10 and the actuator 12, to operate these elements.

When, in this condition, the engine 1 is started, the engine controlling microcomputer 10 processes engine data representing the engine rotation speed, the opening degree of a throttle valve, the actuation of a brake and the temperature of an intake air, and charging system data representing the battery terminal voltage and the output voltage of a generator, which are supplied from the charge control microcomputer 10, to thereby output an operating instruction as to engagement, disengagement or slip through the output terminal 806 to the clutch device 2, and applies an acceleration or deceleration ratio instruction through the output terminal 805 to the speed change gear 3, so that the charging generator is driven within an optimum, predetermined range of r.p.m. at all times.

The charge control microcomputer 8 processes the engine data from the engine controlling microcomputer 10, and charge system data including battery terminal voltage data and generated voltage data, so as to calculate and apply a reference voltage value most suitable for the engine 1 and the charge system to the voltage regulator 6 through the reference signal output terminal 803. When the charging generator 4 produces no power or is not controlled at all, or the first rectifier output terminal is disconnected, the charge control microcomputer detects the occurrence of this problem on the basis of data from various points in the charge system, and applies the detection signal to the display unit 9, so that the problem or fault thus detected is displayed thereon.

As was described in detail above, in the device of the invention, a clutch device and a speed change device are arranged between the engine and a charging generator and are controlled by a charge control microcomputer which processes engine data, the battery terminal voltage data and the generated voltage data, so that the charging generator is driven within an optimum, predetermined range of r.p.m. at all times. Accordingly, problems caused by the variation in speed of the charging generator, such as an insufficient output in the low speed operation range of the engine, or the increase of loss in the high speed range, are eliminated according to the invention. For example, when the engine rotating speed is lower than some predetermined value when an engine is first started, the clutch may be controlled to repeatedly engage and disengage. When the rotation speed is sufficiently higher, the clutch can be controlled to operate in a slip condition. Further, when the clutch is engaged, the speed change gear mechanism can be controlled so that the charging generator can be driven within a preferred range of rotational speeds. Further, when an acceleration condition is detected from the throttle opening, the load on the engine can be reduced by controlling the clutch to disengage the charging generator or by controlling the speed change gear mechanism to change its gear ratio. Altenatively, when a deceleration condition is detected, the speed change gear mechanism can be controlled to increase the rotational speed of the charging generator, resulting in an increasing of the load on the engine to thereby increase the braking power. Thus, the charging generator can be operated under optimum conditions.

Furthermore, in the invention, the charge control microcomputer processes engine data and charging system data to determine the reference voltage for the voltage regulator. Therefore, the invention has the effect that the most suitable reference voltage is determined for the charging of the battery and the mechanical load can be readily controlled during acceleration or deceleration of the engine. For example, when an acceleration condition is detected from the throttle opening, the control voltage instruction value at the reference signal output terminal 803 is reduced to thereby decrease the load applied to the engine. On the other hand, when a deceleration condition is detected, e.g., from a vehicle brake, the control voltage instruction value at the terminal 803 is increased to thereby increase the load applied to the engine.

Moreover, in the device of the invention, the occurrence of a charging system problem is detected according to data from various points in the charging system and the results of this detection are displayed. Accordingly, for instance, when the charging generator produces no power or is not controlled at all and the first rectifier output terminal is disconnected, such problems can be detected by the device of the invention and the clutch can be disengaged to disable the charging generator, unlike the conventional device. In addition, the problem can be displayed on the display unit according to the content thereof which contributes to a reduction in the required repair time.

In the above-described embodiment of the invention, the generated voltage data is obtained from the neutral point 404 of the armature coils of the charging generator 4; however, it may be obtained from the second rectifier output terminal 402 or a one-phase output terminal of the armature coil assembly with the same effect.

What is claimed is:

1. A charge control microcomputer device for a vehicle, comprising:

speed changing means for transmitting the output torque of an engine, said speed changing means including slip clutch means having an output with a variable slippage amount with respect to its input and controlled in accordance with an operating instruction, said speed changing means further including a speed change gear for changing the rotational speed input thereto at an output thereof, said speed change gear receiving the output of said slip clutch means;

a charging generator driven by the output of said speed change gear;

a battery charged by an output voltage of said charging generator;

a voltage regulator for controlling the output voltage of said charging generator to a predetermined value;

an engine controlling microcomputer for receiving data from said engine, to control said engine, said engine data comprising at least an engine speed signal;

a charge control microcomputer for processing engine data from said engine controlling microcomputer and charge system data including terminal voltage data from said battery and generated voltage data from said changing generator, to provide a reference voltage from said voltage regulator, for detecting charging system faults according to said charge system data, and for processing an engine speed signal to apply said operating instruction to said speed changing means, so that said charging generator is driven with a predetermined range of revolutions per minute at all times; and a display unit for displaying detection data, including fault detection data, from said charge control microcomputer.

2. A device as claimed in claim 1, wherein said speed changing means includes slip clutch means controlled as to a slippage amount thereof by said operating instruction.

3. A device as claimed in claim 2, said speed changing means further including a speed change gear for changing the rotational speed input thereto at an output thereof, said speed change gear receiving an output of said slip clutch means, the output of said speed change gear being coupled to said charging generator.

4. A device as claimed in claim 1, said speed change means further receiving a transmission ratio instruction signal from said charge control microcomputer to control a speed change ratio thereof.

* * * * *